(12) United States Patent
Chechik et al.

(10) Patent No.: US 11,017,025 B2
(45) Date of Patent: *May 25, 2021

(54) RELEVANCE-BASED IMAGE SELECTION

(71) Applicant: Google LLC, Mountain View, CA (US)

(72) Inventors: Gal Chechik, Mountain View, CA (US); Samy Bengio, Los Altos, CA (US)

(73) Assignee: Google LLC, Mountain View, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/100,414

(22) Filed: Aug. 10, 2018

(65) Prior Publication Data

US 2018/0349391 A1 Dec. 6, 2018

Related U.S. Application Data

(63) Continuation of application No. 14/687,116, filed on Apr. 15, 2015, now Pat. No. 10,614,124, which is a continuation of application No. 12/546,436, filed on Aug. 24, 2009, now abandoned.

(51) Int. Cl.
| | |
|---|---|
| *G06F 16/70* | (2019.01) |
| *G06F 16/78* | (2019.01) |
| *G06F 16/738* | (2019.01) |
| *G06F 16/74* | (2019.01) |
| *G06F 16/783* | (2019.01) |

(52) U.S. Cl.
CPC .......... *G06F 16/7867* (2019.01); *G06F 16/70* (2019.01); *G06F 16/738* (2019.01); *G06F 16/743* (2019.01); *G06F 16/78* (2019.01); *G06F 16/783* (2019.01); *G06F 16/7844* (2019.01)

(58) Field of Classification Search
CPC ........................... G06F 16/7867; G06F 16/70
See application file for complete search history.

(56) References Cited

U.S. PATENT DOCUMENTS

| | | |
|---|---|---|
| 6,574,378 B1 | 6/2003 | Lim |
| 2002/0164070 A1 | 11/2002 | Kuhner et al. |
| 2003/0097301 A1 | 5/2003 | Kageyama et al. |
| 2003/0103565 A1 | 6/2003 | Xie et al. |

(Continued)

FOREIGN PATENT DOCUMENTS

CN 101071439 11/2007

OTHER PUBLICATIONS

Extended European Search Report dated Jan. 31, 2014 for European Patent Application No. 10812505.5, 6 pages.

(Continued)

*Primary Examiner* — Eliyah S. Harper
(74) *Attorney, Agent, or Firm* — Dority & Manning P.A.

(57) ABSTRACT

A system, computer readable storage medium, and computer-implemented method presents video search results responsive to a user keyword query. The video hosting system uses a machine learning process to learn a feature-keyword model associating features of media content from a labeled training dataset with keywords descriptive of their content. The system uses the learned model to provide video search results relevant to a keyword query based on features found in the videos. Furthermore, the system determines and presents one or more thumbnail images representative of the video using the learned model.

20 Claims, 10 Drawing Sheets

(56) References Cited

U.S. PATENT DOCUMENTS

| | | | |
|---|---|---|---|
| 2003/0126136 A1* | 7/2003 | Omoigui | H04L 29/06 |
| 2004/0125877 A1* | 7/2004 | Chang | H04N 21/2343 |
| | | | 375/240.28 |
| 2005/0267879 A1 | 12/2005 | Sekiguchi et al. | |
| 2006/0179051 A1 | 8/2006 | Whitney et al. | |
| 2006/0179454 A1 | 8/2006 | Shusman | |
| 2007/0067724 A1 | 3/2007 | Takahashi et al. | |
| 2007/0094251 A1 | 4/2007 | Lu et al. | |
| 2007/0255565 A1 | 11/2007 | Yu et al. | |
| 2007/0255755 A1* | 11/2007 | Zhang | G06F 16/78 |
| 2008/0118151 A1 | 5/2008 | Bouguet et al. | |
| 2008/0120291 A1 | 5/2008 | Delgo et al. | |
| 2008/0193016 A1* | 8/2008 | Lim | G06K 9/00711 |
| | | | 382/190 |
| 2009/0327236 A1 | 12/2009 | Denney et al. | |
| 2009/0327856 A1 | 12/2009 | Mouilleseaux et al. | |
| 2010/0191689 A1* | 7/2010 | Cortes | G06F 16/783 |
| | | | 706/46 |

OTHER PUBLICATIONS

Grangier et al., "A Discriminative Kernal-Based Model to Rank Images from Text Queries," IEEE Transactions on Pattern Analysis and Machine Intelligence, 2008, 14 pages.

Li.et al., "Bridging the semantic gap in sports video retrieval and summarization," Journal of Visual Communication and Image Representation, vol. 15, 2004, pp. 393-424.

PCT International Search Report and Written Opinion dated Oct. 6, 2010 for PCT/US2010/045909, 9 pages.

Rui et al., "Automatically Extracting Highlights for TV Baseball Programs," Microsoft Research, International Multimedia Conference Archive Proceedings of the Eighth ACM International Conference on Multimedia, 2000, 11 pages.

* cited by examiner

RELEVANCE-BASED IMAGE SELECTION

CROSS-REFERENCE TO RELATED APPLICATIONS

This application is a continuation of and claims priority to co-pending U.S. patent application Ser. No. 14/687,116, having a filing date of Apr. 15, 2015, which is a Continuation of and claims priority to U.S. patent application Ser. No. 12/546,436, having a filing date of Aug. 24, 2009. All of the above applications are incorporated by reference herein in their entirety.

BACKGROUND

1. Field of the Art

The invention relates generally to identifying videos or their parts that are relevant to search terms. In particular, embodiments of the invention are directed to selecting one or more representative thumbnail images based on the audio-visual content of a video.

2. Background

Users of media hosting websites typically browse or search the hosted media content by inputting keywords or search terms to query textual metadata describing the media content. Searchable metadata may include, for example, titles of the media files or descriptive summaries of the media content. Such textual metadata often is not representative of the entire content of the video, particularly when a video is very long and has a variety of scenes. In other words, if a video has a large number of scenes and variety of content, it is likely that some of those scenes are not described in the textual metadata, and as a result, that video would not be returned in response to searching on keywords that would likely describe such scenes. Thus, conventional search engines often fail to return the media content most relevant to the user's search.

A second problem with conventional media hosting websites is that due to the large amount of hosted media content, a search query may return hundreds or even thousands of media files responsive to the user query. Consequently, the user may have difficulties assessing which of the hundreds or thousands of search results are most relevant. In order to assist the user in assessing which search results are most relevant, the website may present each search result together with a thumbnail image. Conventionally, the thumbnail image used to represent a video is a predetermined frame from the video file (e.g., the first frame, center frame, or last frame). However, a thumbnail selected in this manner is often not representative of the actual content of the video, since there is no relationship between the ordinal position of the thumbnail and the content of a video. Furthermore, the thumbnail may not be relevant to the user's search query. Thus, the user may have difficulty assessing which of the hundreds or thousands of search results are most relevant.

Accordingly, improved methods of finding and presenting media search results that will allow a user to easily assess their relevance are needed.

SUMMARY OF THE INVENTION

A system, computer readable storage medium, and computer-implemented method finds and presents video search results responsive to a user keyword query. A video hosting system receives a keyword search query from a user and selects a video having content relevant to the keyword query. The video hosting system selects a frame from the video as representative of the video's content using a video index that stores keyword association scores between frames of a plurality of videos and keywords associated with the frames. The video hosting system presents the selected frame as a thumbnail for the video.

In one aspect, a computer system generates the searchable video index using a machine-learned model of the relationships between features of video frames, and keywords descriptive of video content. The video hosting system receives a labeled training dataset that includes a set of media items (e.g., images or audio clips) together with one or more keywords descriptive of the content of the media items. The video hosting system extracts features characterizing the content of the media items. A machine-learned model is trained to learn correlations between particular features and the keywords descriptive of the content. The video index is then generated that maps frames of videos in a video database to keywords based on features of the videos and the machine-learned model.

Advantageously, the video hosting system finds and presents search results based on the actual content of the videos instead of relying solely on textual metadata. Thus, the video hosting system enables the user to better assess the relevance of videos in the set of search results.

The features and advantages described in this summary and the following detailed description are not all-inclusive. Many additional features and advantages will be apparent to one of ordinary skill in the art in view of the drawings, specification, and claims hereof.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
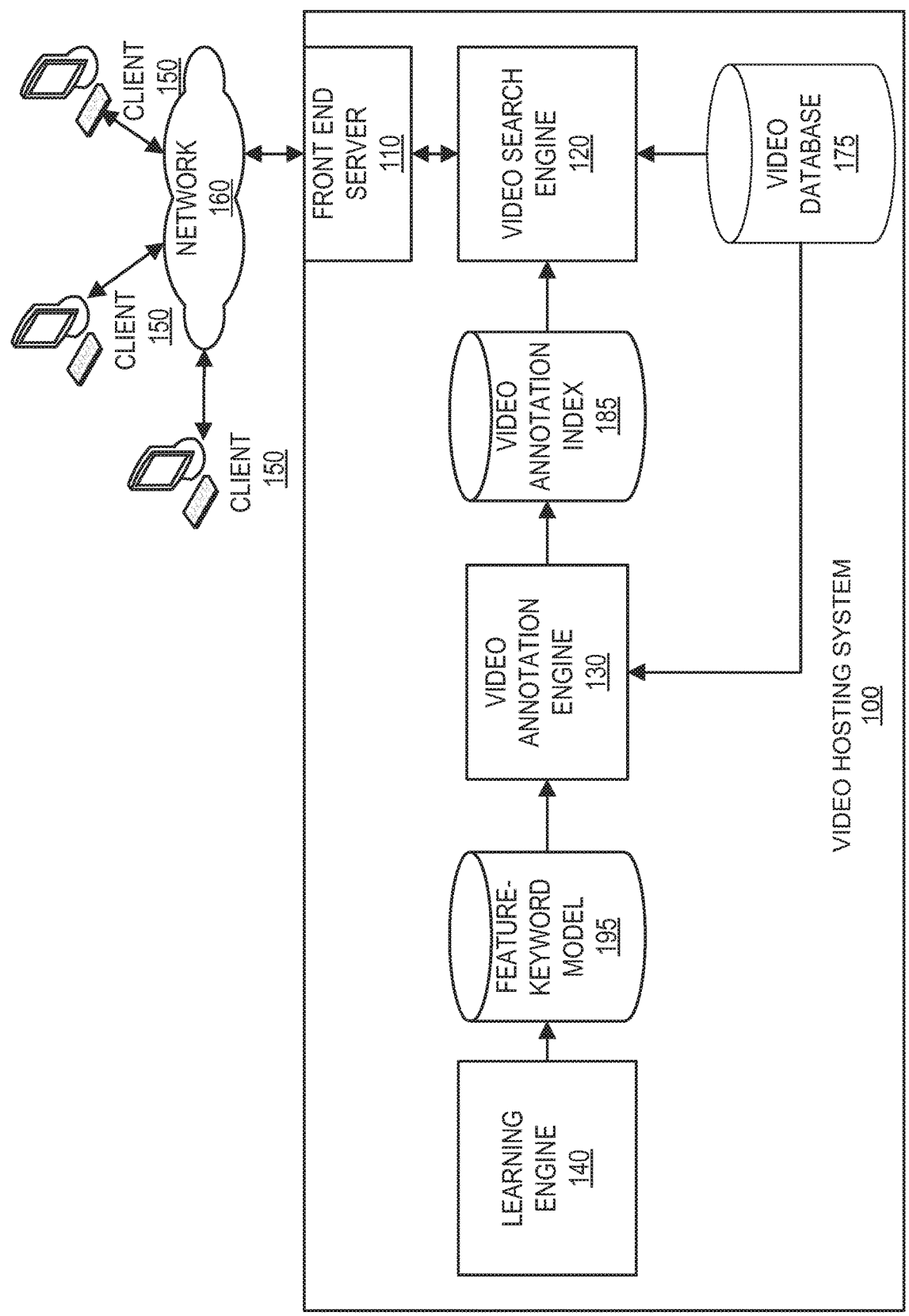
FIG. 1 is a high-level block diagram of a video hosting system 100 according to one embodiment.

FIG. 1 illustrates an embodiment of a video hosting system 100. The video hosting system 100 finds and presents a set of video search results responsive to a user keyword query. Rather than relying solely on textual metadata associated with the videos, the video hosting system 100 presents search results based on the actual audio-visual content of the videos. Each search result is presented together with a thumbnail representative of the audio-visual content of the video that assists the user in assessing the relevance of the results.

In one embodiment, the video hosting system 100 comprises a front end server 110, a video search engine 120, a video annotation engine 130, a learning engine 140, a video database 175, a video annotation index 185, and a feature-keyword model 195. The video hosting system 100 represents any system that allows users of client devices 150 to access video content via searching and/or browsing interfaces. The sources of videos can be from uploads of videos by users, searches or crawls by the system of other websites or databases of videos, or the like, or any combination thereof. For example, in one embodiment, a video hosting system 100 can be configured to allow upload of content by users. In another embodiment, a video hosting system 100 can be configured to only obtain videos from other sources by crawling such sources or searching such sources, either offline to build a database of videos, or at query time.

Each of the various components (alternatively, modules) e.g., front end server 110, a video search engine 120, a video annotation engine 130, a learning engine 140, a video database 175, a video annotation index 185, and a feature-keyword model 195, is implemented as part of a server-class computer system with one or more computers comprising a CPU, memory, network interface, peripheral interfaces, and other well known components. The computers themselves preferably run an operating system (e.g., LINUX), have generally high performance CPUs, 1 G or more of memory, and 100 G or more of disk storage. Of course, other types of computers can be used, and it is expected that as more powerful computers are developed in the future, they can be configured in accordance with the teachings here. In this embodiment, the modules are stored on a computer readable storage device (e.g., hard disk), loaded into the memory, and executed by one or more processors included as part of the system 100. Alternatively, hardware or software modules may be stored elsewhere within the system 100. When configured to execute the various operations described herein, a general purpose computer becomes a particular computer, as understood by those of skill in the art, as the particular functions and data being stored by such a computer configure it in a manner different from its native capabilities as may be provided by its underlying operating system and hardware logic. A suitable video hosting system 100 for implementation of the system is the YOUTUBE™ website; other video hosting systems are known as well, and can be adapted to operate according to the teachings disclosed herein. It will be understood that the named components of the video hosting system 100 described herein represent one embodiment of the present invention, and other embodiments may include other components. In addition, other embodiments may lack components described herein and/or distribute the described functionality among the modules in a different manner. Additionally, the functionalities attributed to more than one component can be incorporated into a single component.

FIG. 1 also illustrates three client devices 150 communicatively coupled to the video hosting system 100 over a network 160. The client devices 150 can be any type of communication device that is capable of supporting a communications interface to the system 100. Suitable devices may include, but are not limited to, personal computers, mobile computers (e.g., notebook computers), personal digital assistants (PDAs), smartphones, mobile phones, and gaming consoles and devices, network-enabled viewing devices (e.g., settop boxes, televisions, and receivers). Only three clients 150 are shown in FIG. 1 in order to simplify and clarify the description. In practice, thousands or millions of clients 150 can connect to the video hosting system 100 via the network 160.

The network 160 may be a wired or wireless network. Examples of the network 160 include the Internet, an intranet, a WiFi network, a WiMAX network, a mobile telephone network, or a combination thereof. Those of skill in the art will recognize that other embodiments can have different modules than the ones described here, and that the functionalities can be distributed among the modules in a different manner. The method of communication between the client devices and the system 100 is not limited to any particular user interface or network protocol, but in a typical embodiment a user interacts with the video hosting system 100 via a conventional web browser of the client device 150, which employs standard Internet protocols.

The clients 150 interact with the video hosting system 100 via the front end server 110 to search for video content stored in the video database 175. The front end server 110 provides controls and elements that allow a user to input search queries (e.g., keywords). Responsive to a query, the front end server 110 provides a set of search results relevant to the query. In one embodiment, the search results include a list of links to the relevant video content in the video database 175. The front end server 110 may present the links together with information associated with the video content such as, for example, thumbnail images, titles, and/or textual summaries. The front end server 110 additionally provides controls and elements that allow the user to select a video from the search results for viewing on the client 150.

The video search engine 120 processes user queries received via the front end server 110, and generates a result set comprising links to videos or portions of videos in the video database 175 that are relevant to the query, and is one means for performing this function. The video search engine 120 may additionally perform search functions such as ranking search results and/or scoring search results according to their relevance. In one embodiment, the video search engine 120 find relevant videos based on the textual metadata associated with the videos using various textual querying techniques. In another embodiment, the video search engine 120 searches for videos or portions of videos based on their actual audio-visual content rather than relying on textual metadata. For example, if the user enters the search query "car race," the video search engine 120 can find and return a car racing scene from a movie, even though the scene may only be a short portion of the movie that is not described in the textual metadata. A process for using the video search engine to locate particular scenes of video based on their audio-visual content is described in more detail below with reference to FIG. 10.

In one embodiment, the video search engine 120 also selects a thumbnail image or a set of thumbnail images to display with each retrieved search result. Each thumbnail image comprises an image frame representative of the video's audio-visual content and responsive to the user's query, and assists the user in determining the relevance of the search result. Methods for selecting the one or more representative thumbnail images are described in more detail below with reference to FIGS. 8-9.

The video annotation engine 130 annotates frames or scenes of video from the video database 175 with keywords relevant to the audio-visual content of the frames or scenes and stores these annotations to the video annotation index 185, and is one means for performing this function. In one embodiment, the video annotation engine 130 generates feature vectors from sampled portions of video (e.g., frames of video or short audio clips) from the video database 175. The video annotation engine 130 then applies a learned feature-keyword model 195 to the extracted feature vectors to generate a set of keyword scores. Each keyword score represents the relative strength of a learned association between a keyword and one or more features. Thus, the score can be understood to describe a relative likelihood that the keyword is descriptive of the frame's content. In one embodiment, the video annotation engine 130 also ranks the frames of each video according to their keyword scores, which facilitates scoring and ranking the videos at query time. The video annotation engine 130 stores the keyword scores for each frame to the video annotation index 185. The video search engine 120 may use these keyword scores to determine videos or portions of videos most relevant to a user query and to determine thumbnail images representative of the video content. The video annotation engine 130 is described in more detail below with reference to FIG. 6.

The learning engine 140 uses machine learning to train the feature-keyword model 195 that associates features of images or short audio clips with keywords descriptive of their visual or audio content, and is one means for performing this function. The learning engine 140 processes a set of labeled training images, video, and/or audio clips ("media items") that are labeled with one or more keywords representative of the media item's audio and or visual content. For example, an image of a dolphin swimming in the ocean may be labeled with keywords such as "dolphin," "swimming," "ocean," and so on. The learning engine 140 extracts a set of features from the labeled training data (images, video, or audio) and analyzes the extracted features to determine statistical associations between particular features and the labeled keywords. For example, in one embodiment, the learning engine 140 generates a matrix of weights, frequency values, or discriminative functions indicating the relative strength of the associations between the keywords that have been used to label a media item and the features that are derived from the content of the media item. The learning engine 140 stores the derived relationships between keywords and features to the feature-keyword model 195. The learning engine 140 is described in more detail below with reference to FIG. 2.

Figure 2:
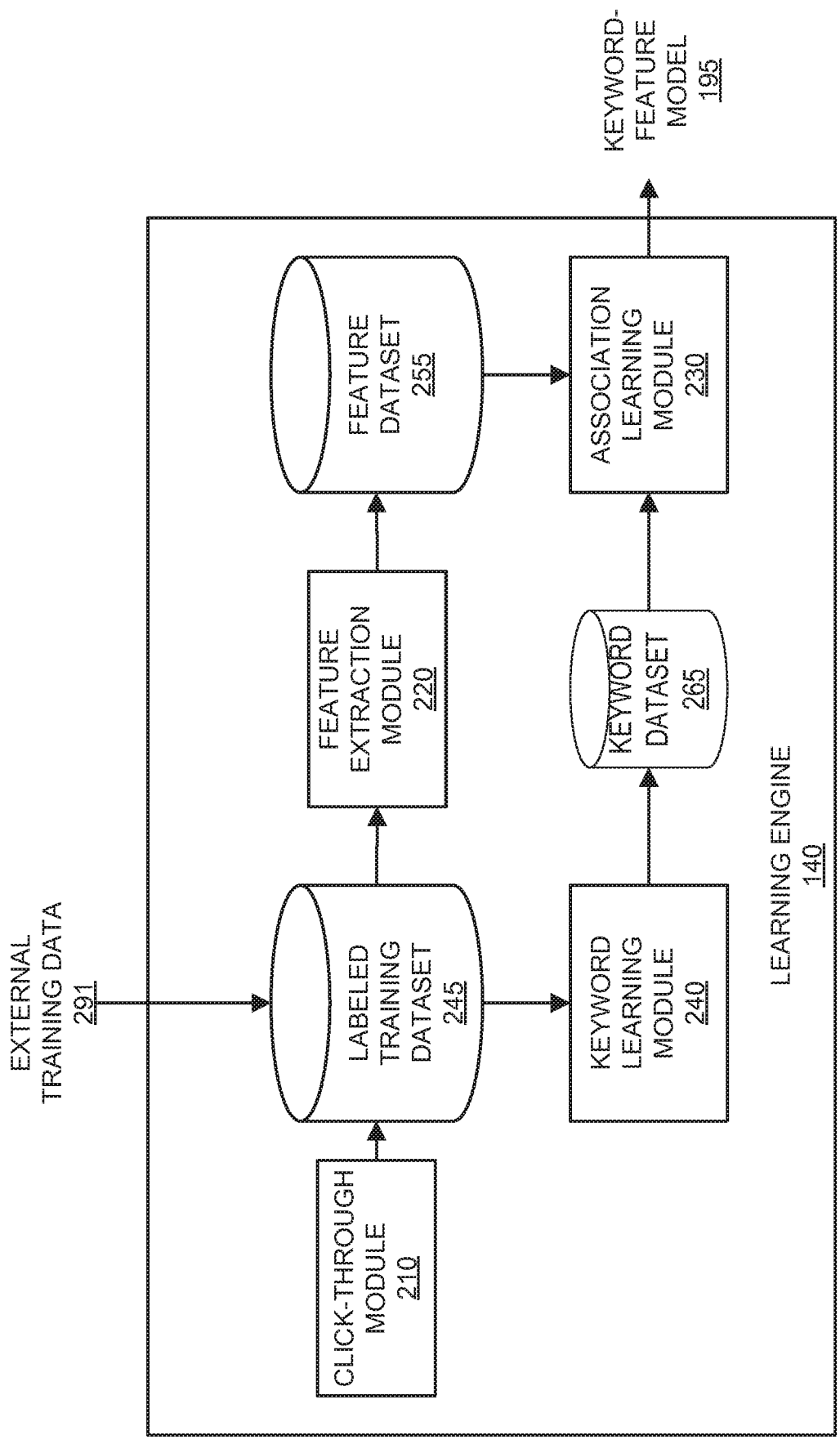
FIG. 2 is a high-level block diagram illustrating a learning engine 140 according to one embodiment.

FIG. 2 is a block diagram illustrating a detailed view of the learning engine 140 according to one embodiment. In the illustrated embodiment, the learning engine comprises a click-through module 210, a feature extraction module 220, a keyword learning module 240, an association learning module 230, a labeled training dataset 245, a feature dataset 255, and a keyword dataset 265. Those of skill in the art will recognize that other embodiments can have different modules than the ones described here, and that the functionalities can be distributed among the modules in a different manner. In addition, the functions ascribed to the various modules can be performed by multiple engines.

The click-through module 210 provides an automated mechanism for acquiring a labeled training dataset 245, and is one means for performing this function. The click-through module 210 tracks user search queries on the video hosting system 100 or on one or more external media search websites. When a user performs a search query and selects a media item from the search results, the click-through module 210 stores a positive association between keywords in the user query and the user-selected media item. The click-through module 210 may also store negative association between the keywords and unselected search results. For example, a user searches for "dolphin" and receives a set of image results. The image that the user selects from the list is likely to actually contain an image of a dolphin and therefore provides a good label for the image. Based on the learned positive and/or negative associations, the click-through module 210 determines one or more keywords to attach to each image. For example, in one embodiment, the click-through module 210 stores a keyword for a media item after a threshold number of positive associations between the image and the keyword are observed (e.g., after 5 users searching for "dolphin" select the same image from the result set). Thus, the click-through module 210 can statistically identify relationships between keywords and images, based on monitoring user searches and the resulting user actions in selecting search results. This approaches takes advantage of the individual user's knowledge of what counts as relevant images for a given keywords in the ordinary course of their search behavior. In some embodiments, the keyword identification module 240 may use natural language techniques such as stemming and filtering to preprocess search query data in order to identify and extract keywords. The click-through module 210 stores the labeled media items and their associated keywords to the labeled training dataset 245.

In an alternative embodiment, the labeled training dataset 245 may instead store training data from external sources 291 such as, for example, a database of labeled stock images or audio clips. In one embodiment, keywords are extracted from metadata associated with images or audio clips such as file names, titles, or textual summaries. The labeled training dataset 245 may also store data acquired from a combination of the sources discussed above (e.g., using data derived from both the click-through module 210 and from one or more external databases 291).

The feature extraction module 220 extracts a set of features from the labeled training data 245, and is one means for performing this function. The features characterize different aspects of the media in such a way that images of similar objects will have similar features and audio clips of similar sounds will have similar features. To extract features from images, the feature extraction module 220 may apply texture algorithms, edge detection algorithms, or color identification algorithms to extract image features. For audio clips, the feature extraction module 220 may apply various transforms on the sound wave, like generating a spectrogram, apply a set of band-pass filters or auto correlations, and then apply vector quantization algorithms to extract audio features.

In one embodiment, the feature extraction module 220 segments training images into "patches" and extracts features for each patch. The patches can range in height and width (e.g., 64×64 pixels). The patches may be overlapping or non-overlapping. The feature extraction module 220 applies an unsupervised learning algorithm to the feature data to identify a subset of the features that most effectively characterize a majority of the images patches. For example, the feature extraction module 220 may apply a clustering algorithm (e.g., K-means clustering) to identify clusters or groups of features that are similar to each other or co-occur in images. Thus, for example, the feature extraction module 220 can identify the 10,000 most representative feature patterns and associated patches.

Similarly, the feature extraction module 220 segments training audio clips into short "sounds" and extracts features for the sounds. As with the training images, the feature extraction module 220 applies unsupervised learning to identify a subset of audio features most effectively characterizing the training audio clips.

The keyword identification module 240 identifies a set of frequently occurring keywords based on the labeled training dataset 245, and is one means for performing this function. For example, in one embodiment, the keyword identification module 240 determines the N most common keywords in the labeled training dataset (e.g., N=20,000). The keyword identification module 220 stores the set of frequently occurring keywords in the keyword dataset 265.

The association learning module 230 determines statistical associations between the features in the feature dataset 255 and the keywords in the keyword dataset 265, and is one means for performing this function. For example, in one embodiment, the association learning module 230 represents the associations in the form of a feature-keyword matrix. The feature-keyword matrix comprises a matrix with m rows and n columns, where each of the m rows corresponds to a different feature vector from the feature dataset 255 and each of the n columns corresponds to a different keyword from the keyword dataset 265 (e.g., m=10,000 and n=20,000). In one embodiment, each entry of the feature-keyword matrix comprises a weight or score indicating the relative strength of the correlation between a feature and a keyword in the training dataset. For example, an entry in the matrix dataset may indicate the relative likelihood that an image labeled with the keyword "dolphin" will exhibit a feature particular feature vector Y. The association learning module 230 stores the learned feature-keyword matrix to the learned feature-keyword model 195. In other alternative embodiments, different association functions and representations may be used, such as, for example, a nonlinear function that relates keywords to the visual and/or audio features.

Figure 3:
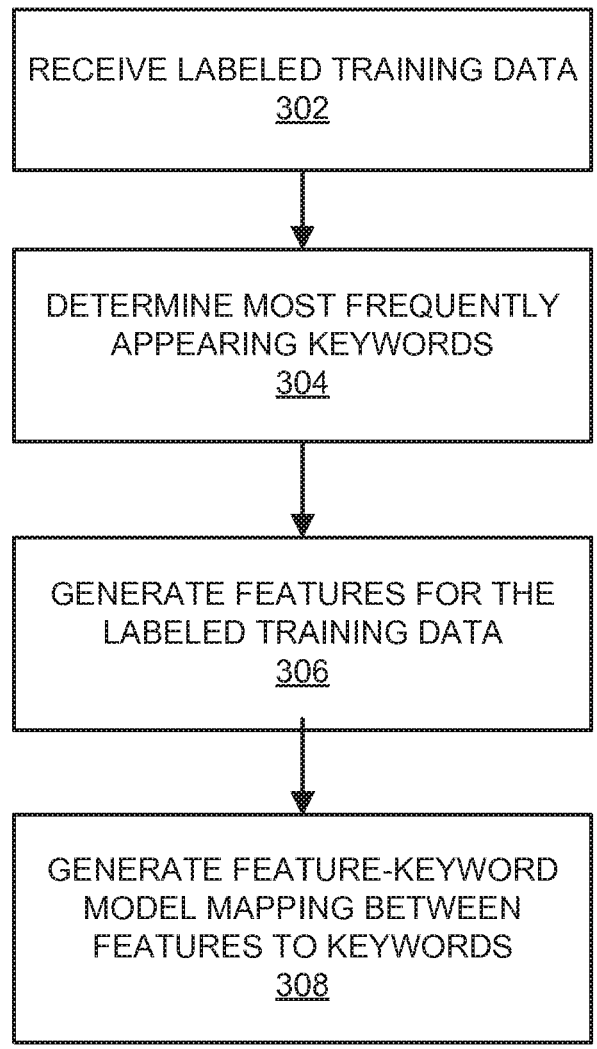
FIG. 3 is a flowchart illustrating steps performed by the learning engine 140 to generate a learned feature-keyword model according to one embodiment.

FIG. 3 is a flowchart illustrating an embodiment of a method for generating the feature-keyword model 195. First, the matrix learning engine 140 receives 302 a set of labeled training data 245, for example, from an external source 291 or from the click-through module 210 as described above. The keyword learning module 240 determines 304 the most frequently appearing keywords in the labeled training data 245 (e.g., the top 20,000 keywords). The feature extraction module 220 then generates 306 features for the training data 245 and stores the representative features to the feature dataset 255. The association learning module 230 generates 308 a feature-keyword matrix mapping the keywords to features and stores the mappings to the feature-keyword model 195.

Figure 4:
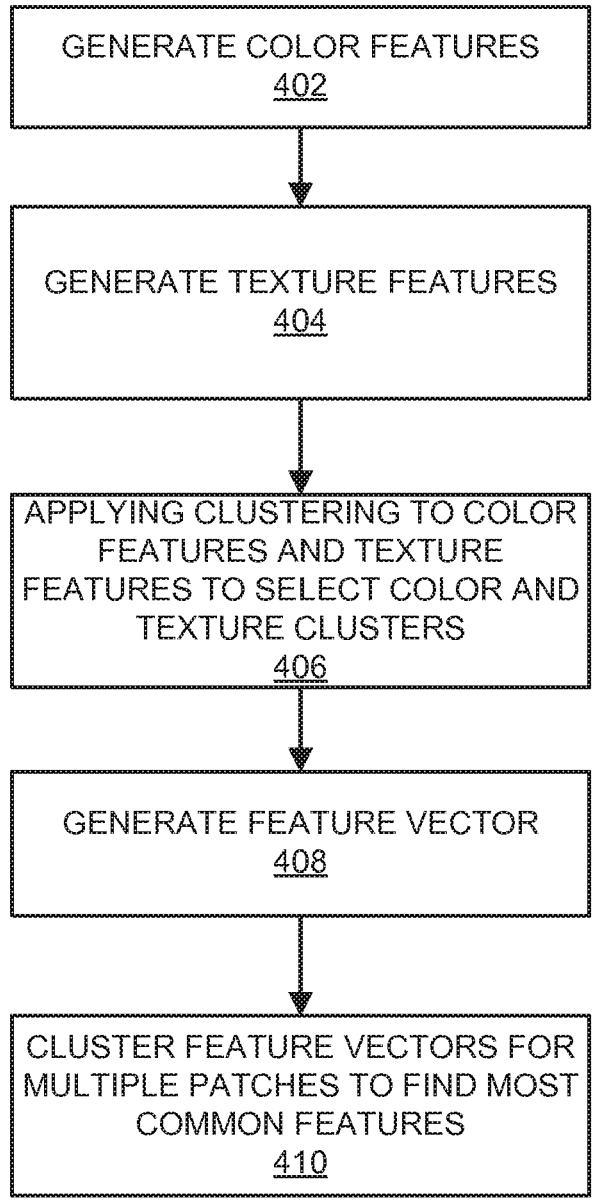
FIG. 4 is a flowchart illustrating steps performed by the learning engine 140 to generate a feature dataset 255 according to one embodiment.

FIG. 4 illustrates an example embodiment of a process for generating 306 the features from the labeled training images 245. In the example embodiment, the feature extraction module 220 generates 402 color features by determining color histograms that represent the color data associated with the image patches. A color histogram for a given patch stores the number of pixels of each color within the patch.

The feature extraction module 220 also generates 404 texture features. In on embodiment, the feature extraction module 220 uses local binary patterns (LBPs) to represent the edge and texture data within each patch. The LBPs for a pixel represents the relative pixel intensity values of neighboring pixels. For example, the LBP for a given pixel may be an 8-bit code (corresponding to the 8 neighboring pixels in a circle of radius of 1 pixel) with a 1 indicating that the neighboring pixel has a higher intensity value and a 0 indicating that neighboring pixel has a lower intensity value. The feature extraction module then determines a histogram for each patch that stores a count of LBP values within a given patch.

The feature extraction module 220 applies 406 clustering to the color features and texture features. For example, in one embodiment, the feature extraction module 220 applies K-means clustering to the color histograms to identify a plurality of clusters (e.g. 20) that best represent the patches. For each cluster, a centroid (feature vector) of the cluster is determined, which is representative of the dominant color of the cluster, thus creating a set of dominant color features for all the patches. The feature extraction module 220 separately clusters the LBP histograms to identify a subset of texture histograms (i.e. texture features) that best characterizes the texture of the patches, and thus identifies the set of dominant texture features for the patches as well.

The feature extraction module 220 then generates 408 a feature vector for each patch. In one embodiment, texture and color histograms for a patch are concatenated to form the single feature vector for the patch. The feature extraction module 220 applies an unsupervised learning algorithm (e.g., clustering) to the set of feature vectors for the patches to generate 410 a subset of feature vectors representing a majority of the patches (e.g., the 10,000 most representative feature vectors). The feature extraction module 220 stores the subset of feature vectors to the feature dataset 255.

For audio training data, the feature extraction module 220 may generate audio feature vectors by computing Mel-frequency cepstral coefficients (MFCCs). These coefficients represent the short-term power spectrum of a sound based on a linear cosine transform of a log power spectrum on a nonlinear frequency scale. Audio feature vectors are then stored to the feature dataset 255 and can be processed similarly to the image feature vectors. In another embodiment, the feature extraction module 220 generates audio feature vectors by using stabilized auditory images (SAI). In yet another embodiment, one or more band-pass filters are applied to the audio data and features are derived based on correlations within and among the channels. In yet another embodiment, spectrograms are used as audio features.

Figure 5:
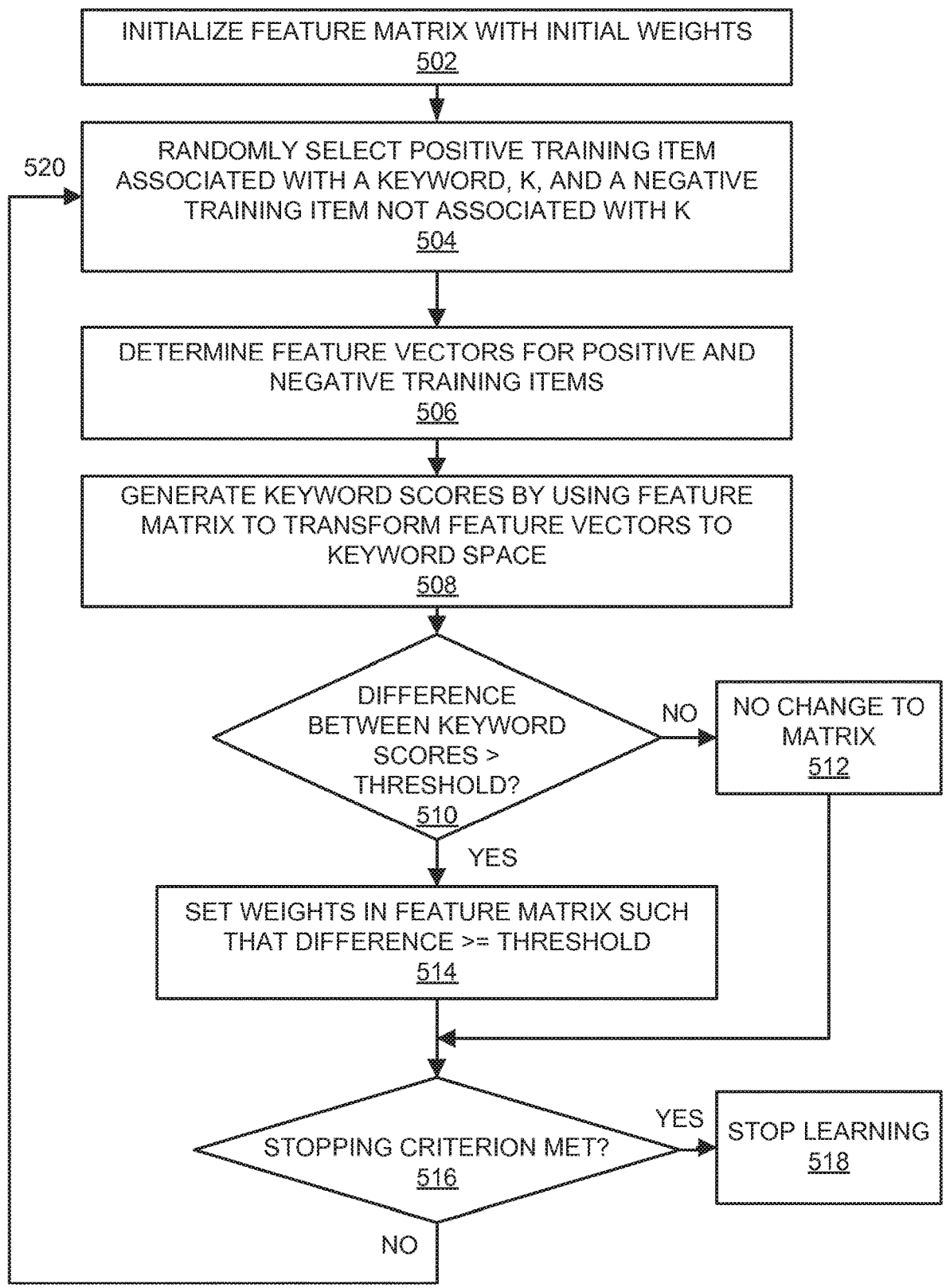
FIG. 5 is a flowchart illustrating steps performed by the learning engine 140 to generate a feature-keyword matrix according to one embodiment.

FIG. 5 illustrates an example process for iteratively learning a feature-keyword matrix from the feature dataset 255 and the keyword dataset 265. In one embodiment, the association learning module 230 initializes 502 the feature-keyword matrix by populating the entries with initial weights. For example, in one embodiment, the initial weights are all set to zero. For a given keyword, K, from the keyword dataset 265, the association learning module 230 randomly selects 504 a positive training item p+ (i.e. a training item labeled with the keyword K) and randomly selects a negative training item p− (i.e. a training item not labeled with the keyword K). The feature extraction module 220 determines 506 feature vectors for both the positive training item and the negative training item as described above. The association learning engine 230 generates 508 keyword scores for each of the positive and negative training items by using the feature-keyword matrix to transform the feature vectors from the feature space to the keyword space (e.g., by multiplying the feature vector and the feature-keyword matrix to yield a keyword vector). The association learning module 230 then determines 510 the difference between the keyword scores. If the difference is greater than a predefined threshold value (i.e., the positive and negative training items are correctly ordered), then the matrix is not changed 512. Otherwise, the matrix entries are set 514 such that the difference is greater than the threshold. The association learning module 230 then determines 516 whether or not a stopping criterion is met. If the stopping criterion is not met, the matrix learning performs another iteration 520 with new positive and negative training items to further refine the matrix. If the stopping criterion is met, then the learning process stops 518.

In one embodiment, the stopping criterion is met when, on average over a sliding window of previously selected positive and negative training pairs, the number of pairs correctly ordered exceeds a predefined threshold. Alternatively, the performance of the learned matrix can be measured by applying the learned matrix to a separate set of validation data, and the stopping criterion is met when the performance exceeds a predefined threshold.

In an alternative embodiment, in order for the scores to be compatible between keywords, keyword scores are computed and compared for different keywords rather than the same keyword K in each iteration of learning process. Thus, in this embodiment, the positive training item p+ is selected as a training item labeled with a first keyword $K_1$ and the negative training item p− is selected as a training item that is not labeled with a different keyword $K_2$. In this embodiment, the association learning module 230 generates keywords scores for each training item/keyword pair (i.e. a positive pair and a negative pair). The association learning module 230 then compares the keywords scores in the same manner as described above even though the keyword scores are related to different keywords.

In alternative embodiments, the association learning module 230 learns a different type of feature-keyword model 195 such as, for example, a generative model or a discriminative model. For example, in one alternative embodiment, the association learning module 230 derives discriminative functions (i.e. classifiers) that can be applied to a set of features to obtain one or more keywords associated with those features. In this embodiment, the association learning module 230 applies clustering algorithms to specific types of features or all features that are associated with an image patch or audio segment. The association learning module 230 generates a classifier for each keyword in the keyword dataset 265. The classifier comprises a discriminative function (e.g. a hyperplane) and a set of weights or other values, where the weights or values specify the discriminative ability of the feature in distinguishing a class of media items from another class of media items. The association learning module 230 stores the learned classifiers to the learned feature-keyword model 195.

In some embodiments, the feature extraction module 220 and the association learning module 230 iteratively generate sets of features for new training data 245 and re-train a classifier until the classifier converges. The classifier converges when the discriminative function and the weights associated with the sets of features are substantially unchanged by the addition of new training sets of features. In a specific embodiment, an on-line support vector machine algorithm is used to iteratively re-calculate a hyperplane function based on features values associated with new training data 245 until the hyperplane function converges. In other embodiments, the association learning module 230 re-trains the classifier on a periodic basis. In some embodiments, the association learning module 230 retrains the classifier on a continuous basis, for example, whenever new search query data is added to the labeled training dataset 245 (e.g., from new click-through data).

In any of the foregoing embodiment, the resulting feature-keyword matrix represents a model of the relationship between keywords (as have been applied to images/audio files) and feature vectors derived from the image/audio files. The model may be understood to express the underlying physical relationship in terms of the co-occurrences of keywords, and the physical characteristics representing the images/audio files (e.g., color, texture, frequency information).

Figure 6:
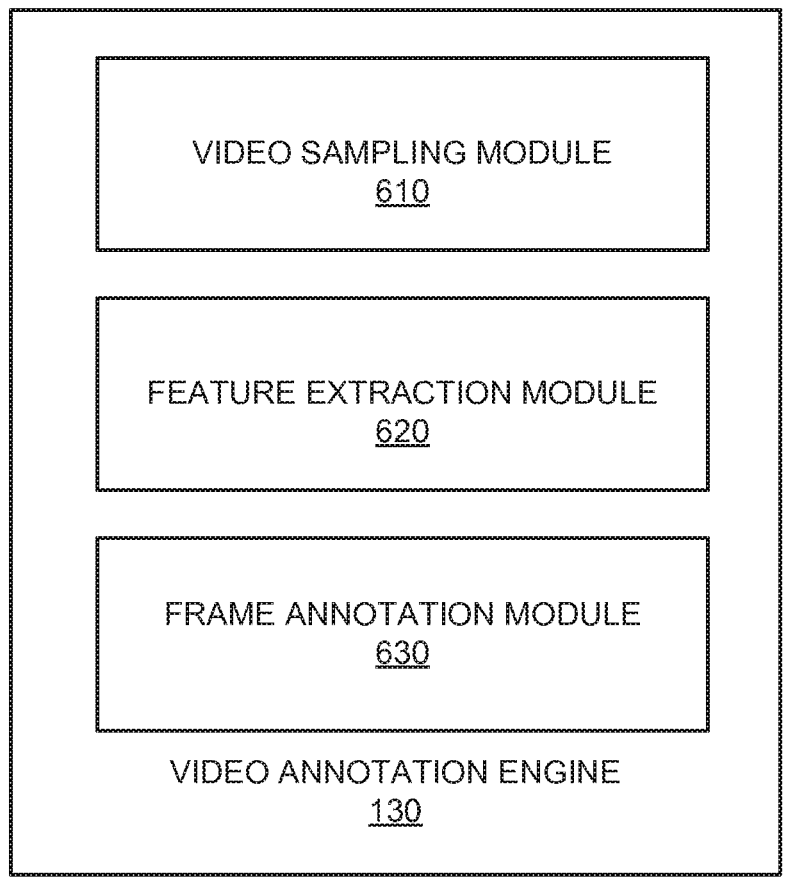
FIG. 6 is a block diagram illustrating a detailed view of a image annotation engine 160 according to one embodiment.

FIG. 6 illustrates a detailed view of the video annotation engine 130. In one embodiment, the video annotation engine 130 includes a video sampling module 610, a feature extraction module 620, and a thumbnail selection module 630. Those of skill in the art will recognize that other embodiments can have different modules than the ones described here, and that the functionalities can be distributed among the modules in a different manner. In addition, the functions ascribed to the various modules can be performed by multiple engines.

The video sampling module 610 samples frames of video content from videos in the video database 175. In one embodiment, the video sampling module 610 samples video content from individual videos in the video database 175. The sampling module 610 can sample a video at a fixed periodic rate (e.g., 1 frame every 10 seconds), a rate dependent on intrinsic factors (e.g. length of the video), or a rate based on extrinsic factors such as the popularity of the video (e.g., more popular videos, based on number of views, would be sampled at a higher frequency than less popular videos). Alternatively, the video sample module 610 uses scene segmentation to sample frames based on the scene boundaries. For example, the video sampling module 610 may sample at least one frame from each scene to ensure that the sampled frames are representative of the whole content of the video. In another alternative embodiment, the video sample module 610 samples entire scenes of videos rather than individual frames.

The feature extraction module 620 uses the same methodology as the feature extraction module 220 described above with respect to the learning engine 140. The feature extraction module 620 generates a feature vector for each sampled frame or scene. For example, as described above each feature vector may comprise 10,000 entries, each being a representative of a particular feature obtained through vector quantization.

The frame annotation module 630 generates keyword association scores for each sampled frame of a video. The frame annotation module 630 applies the learned feature-keyword model 195 to the feature vector for a sample frame to determine the keyword association scores for the frame. For example, the frame annotation module 630 may perform a matrix multiplication using the feature-keyword matrix to transform the feature vector to the keyword space. The frame annotation module 630 thus generates a vector of keyword association scores for each frame ("keyword score vector"), where each keyword association score in the keyword score vector specifies the likelihood that the frame is relevant to a keyword of the set of frequently-used keywords in the keyword dataset 265. The frame annotation module 630 stores the keyword score vector for the frame in association with indicia of the frame (e.g. the offset of the frame in the video the frame is part of) and indicia of the video in the video annotation index 185. Thus, each sampled frame is associated with a keyword vector score that describes the relationship between each of keywords and the frame, based on the feature vectors derived from the frame. Further, each video in the database is thus associated with one or more sampled frames (which can be used for thumbnails) and these sampled frames are associated with keywords, as described.

In alternative embodiments, the video annotation engine 130 generates keyword scores for a group of frames (e.g. scenes) rather for each individual sampled frame. For example, keywords scored may be stored for a particular scene of video. For audio features, keyword scores may be stored in association with a group of frames spanning a particular audio clip, such as, for example, speech from a particular individual.

Operation and Use

When a user inputs a search query of one more words, the search engine 120 accesses the video annotation index 185 to find and present a result set of relevant videos (e.g., by performing a lookup in the index 185). In one embodiment, the search engine 120 uses keyword scores in the video annotation index 185 for the input query words that match the selected keywords, to find videos relevant to the search query and rank the relevant videos in the result set. The video search engine 120 may also provide a relevance score for each search result indicating the perceived relevance to the search query. In addition to or instead of the keyword scores in the video annotation index 185, the search engine 120 may also access a conventional index that includes textual metadata associated with the videos in order to find, rank, and score search results.

Figure 7:
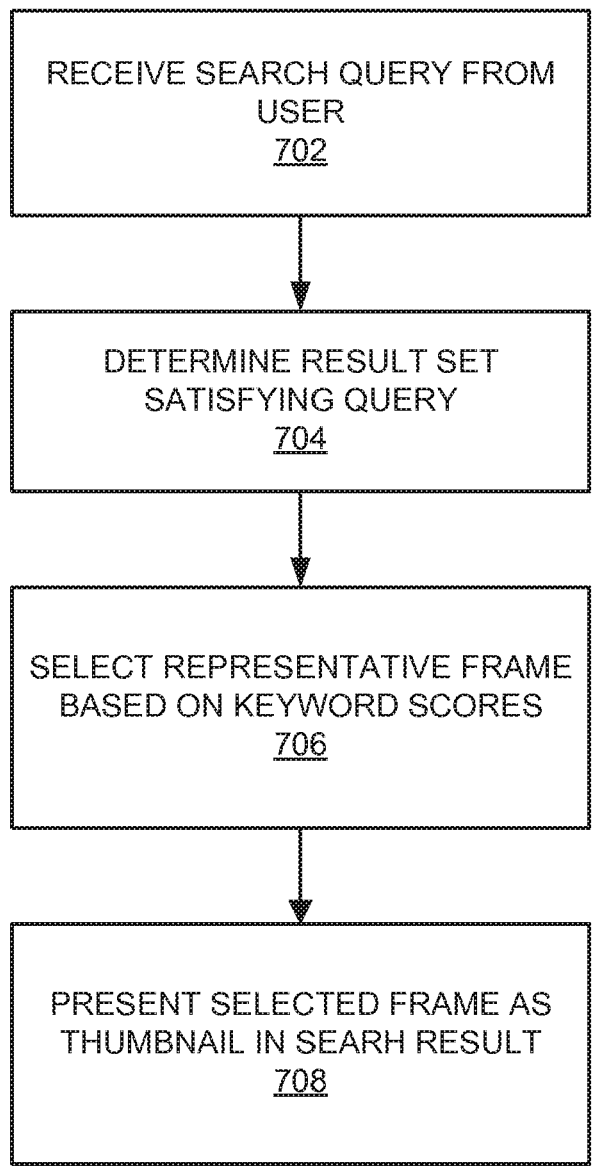
FIG. 7 is a flowchart illustrating steps performed by the video hosting system 100 to find and present video search results according to one embodiment.

FIG. 7 is a flowchart illustrating a general process performed by the video hosting system 100 for finding and presenting video search results. The front end server 110 receives 702 a search query comprising one or more query terms from a user. The search engine 120 determines 704 a result set satisfying the keyword search query; this result set can be selected using any type of search algorithm and index structure. The result set includes a link to one or more videos having content relevant to the query terms.

The search engine 120 then selects 706 a frame (or several frames) from each of the videos in the result set that is representative of the video's content based on the keywords scores. For each search result, the front end server 110 presents 708 the selected frames as a set of one or more representative thumbnails together with the link to the video.

Figure 8:
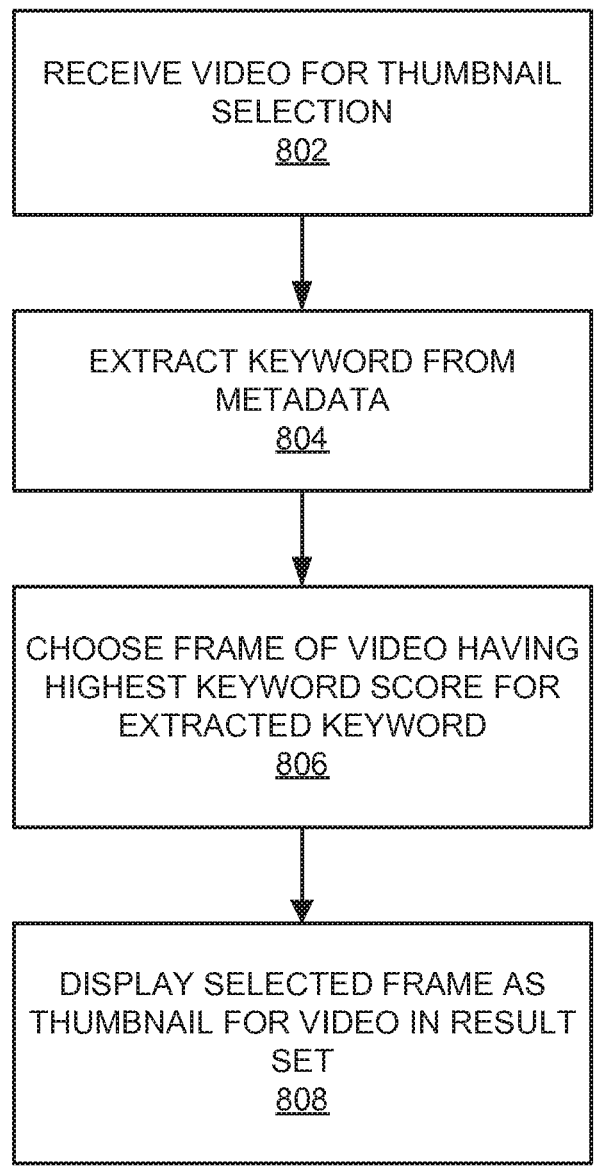
FIG. 8 is a flowchart illustrating steps performed by the video hosting system 100 to select a thumbnail for a video based on video metadata according to one embodiment.
Figure 9:
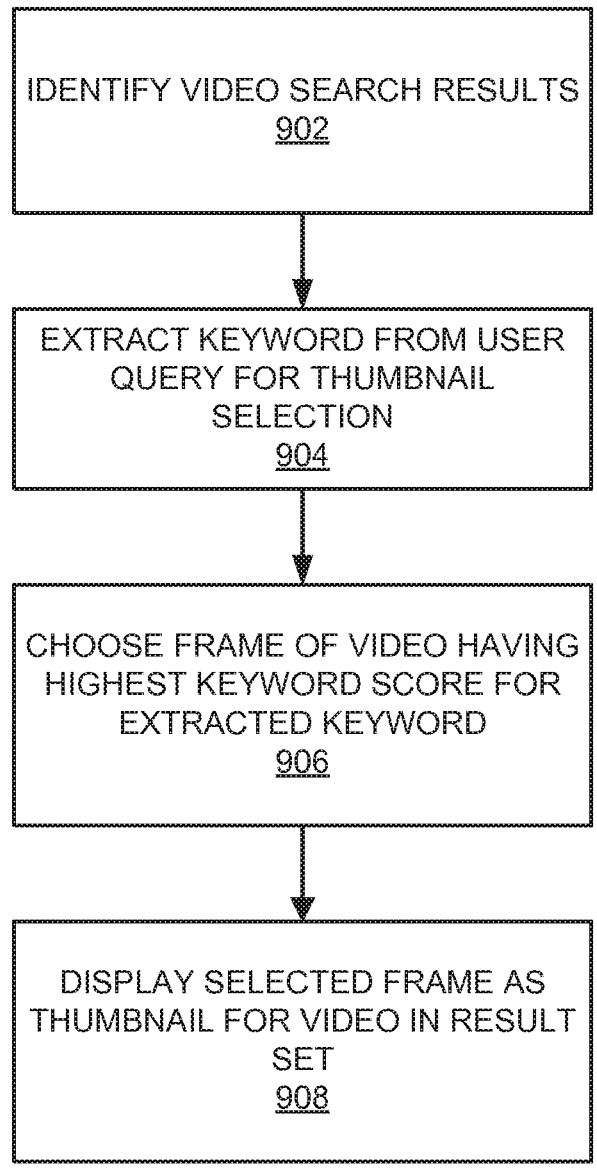
FIG. 9 is a flowchart illustrating steps performed by the video hosting system 100 to select a thumbnail for a video based on keywords in a user search query according to one embodiment.

FIGS. 8 and 9 illustrate two different embodiments by which a frame can be selected 906 based on keyword scores. In the embodiment of FIG. 8, the video search engine 120 selects a thumbnail representative of a video based on textual metadata stored in association with the video in the video database 175. The video search engine 120 selects 802 a video from the video database for thumbnail selection. The video search engine 120 then extracts 804 keywords from metadata stored in association with the video in the video database 175. Metadata may include, for example, the video title or a textual summary of the video provided by the author or other user. The video search engine 120 then accesses the video annotation index 185 and uses the extracted keyword to choose 806 one or more representative frames of video (e.g., by selecting the frame or set of frames having the highest ranked keyword score(s) for the extracted keyword). The front end server 110 then displays 808 the chosen frames as a thumbnail for the video in the search results. This embodiment beneficially ensures that the selected thumbnails will actually be representative of the video content. For example, consider a video entitled "Dolphin Swim" that includes some scenes of a swimming dolphin but other scenes that are just empty ocean. Rather than arbitrarily selecting a thumbnail frame (e.g., the first frame or center frame), the video search engine 120 will select one or more frames that actually depicts a dolphin. Thus, the user is better able to assess the relevance of the search results to the query.

FIG. 9 is a flowchart illustrating a second embodiment of a process for selecting a thumbnail to present with a video in a set of search results. In this embodiment, the one or more selected thumbnails are dependent on the keywords provided in the user search query. First, the search engine 120 identifies 902 a set of video search results based on the user search query. The search engine 120 extracts 904 keywords from the user's search query to use in selecting the representative thumbnail frames for each of the search results. For each video in the result set, the video search engine 120 then accesses the video annotation index 185 and uses the extracted keyword to choose 906 one or more representative frame of video (e.g., by selecting the one or more frames having the highest ranked keyword score(s) for the extracted keyword). The front end server 110 then displays 908 the chosen frames as thumbnails for the video in the search results.

This embodiment beneficially ensures that the video thumbnail is actually related to the user's search query. For example, suppose the user enters the query "dog on a skateboard." A video entitled "Animals Doing Tricks" includes a relevant scene featuring a dog on a skateboard, but also includes several other scenes without dogs or skateboards. The method of FIG. 9 beneficially ensures that the presented thumbnail is representative of the scene that the user searched for (i.e., the dog on the skateboard). Thus, the user can easily assess the relevance of the search results to the keyword query.

Figure 10:
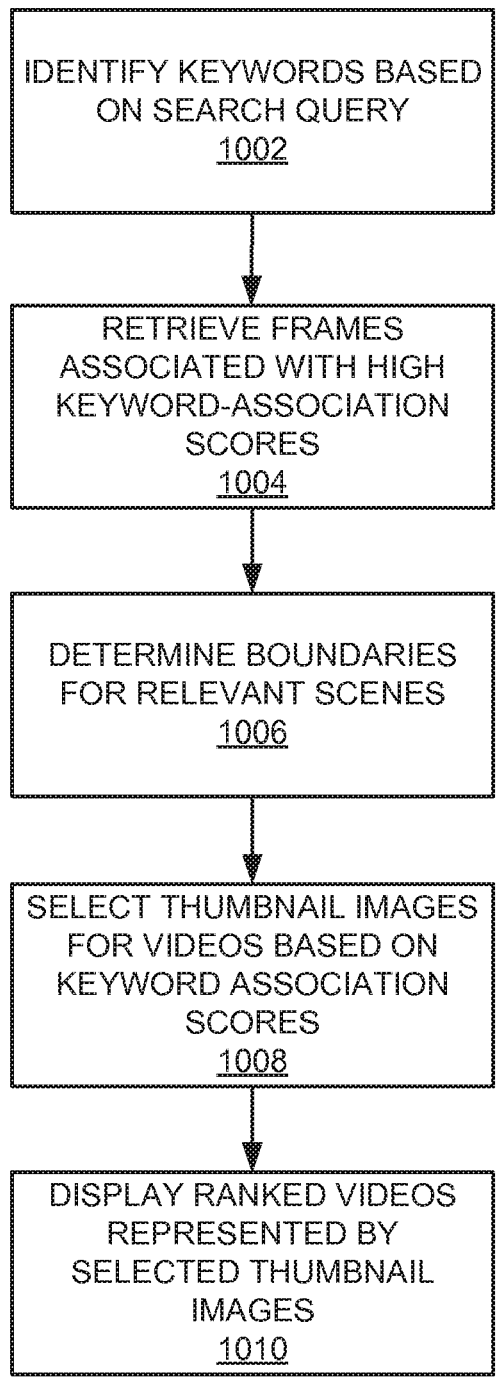
FIG. 10 is a flowchart illustrating steps performed by the image annotation engine 160 to identify specific events or scenes within videos based on a user keyword query according to one embodiment.

Another feature of the video hosting system 100 allows a user to search for specific scenes or events within a video using the video annotation index 185. For example, in a long action movie, a user may want to search for fighting scenes or car racing scenes, using query terms such as "car race" or "fight." The video hosting system 100 then retrieves only the particular scene or scenes (rather than the entire video) relevant to the query. FIG. 10 illustrates an example embodiment of a process for finding scenes or events relevant to a keyword query. The search engine 120 receives 1002 a search query from a user and identifies 1004 keywords from the search string. Using the keywords, the search engine 120 accesses the video annotation index 185 (e.g., by performing a lookup function) to retrieve a number of frames 1006 (e.g., top 10) having the highest keyword scores for the extracted keyword. The search engine then determines 1008 boundaries for the relevant scenes within the video. For example, the search engine 120 may use scene segmentation techniques to find the boundaries of the scene including the highly relevant frame. Alternatively, the search engine 120 may analyze the keyword scores of surrounding frames to determine the boundaries. For example, the search engine 120 may return a video clip in which all sampled frames have keyword scores above a threshold. The search engine 120 selects 1010 a thumbnail image for each video in the result set based on the keyword scores. The front end server 110 then displays 1012 a ranked set of videos represented by the selected thumbnails.

Another feature of the video hosting system 100 is the ability to select a set of "related videos" that may be displayed before, during, or after playback of a user-selected video based on the video annotation index 185. In this embodiment, the video hosting system 100 extracts keywords from the title or other metadata associated with the playback of the selected video. The video hosting system 100 uses the extracted keywords to query the video annotation index 185 for videos relevant to the keywords; this identifies other videos that are likely to be similar to the user selected video in terms of their actual image/audio content, rather than just having the same keywords in their metadata. The video hosting system 100 then chooses thumbnails for the related videos as described above, and presents the thumbnails in a "related videos" portion of the user interface display. This embodiment beneficially provides a user with other videos that may be of interest based on the content of the playback video.

Another feature of the video hosting system 100 is the ability to find and present advertisements that may be displayed before, during, or after playback of a selected video, based on the use of the video annotation index 185. In one embodiment, the video hosting system 100 retrieves keywords associated with frames of video in real-time as the user views the video (i.e., by performing a lookup in the annotation index 185 using the current frame index). The video hosting system 100 may then query an advertisement database using the retrieved keywords for advertisements relevant to the keywords. The video hosting system 100 may then display advertisements related to the current frames in real-time as the video plays back.

The above described embodiments beneficially allow a media host to provide video content items and representative thumbnail images that are most relevant to a user's search query. By learning associations between textual queries and non-textual media content, the video hosting system provides improved search results over systems that rely solely on textual metadata.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the media host service may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. All such process steps, instructions or algorithms are executed by computing devices that include some form of processing unit (e.g., a microprocessor, microcontroller, dedicated logic circuit or the like) as well as a memory (RAM, ROM, or the like), and input/output devices as appropriate for receiving or providing data.

The present invention also relates to an apparatus for performing the operations herein. This apparatus may be specially constructed for the required purposes, or it may comprise a general-purpose computer selectively activated or reconfigured by a computer program stored in the computer, in which event the general-purpose computer is structurally and functionally equivalent to a specific computer dedicated to performing the functions and operations described herein. A computer program that embodies computer executable data (e.g. program code and data) is stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for persistently storing electronically coded instructions. It should be further noted that such computer programs by nature of their existence as data stored in a physical medium by alterations of such medium, such as alterations or variations in the physical structure and/or properties (e.g., electrical, optical, mechanical, magnetic, chemical properties) of the medium, are not abstract ideas or concepts or representations per se, but instead are physical artifacts produced by physical processes that transform a physical medium from one state to another state (e.g., a change in the electrical charge, or a change in magnetic polarity) in order to persistently store the computer program in the medium. Furthermore, the computers referred to in the specification may include a single processor or may be architectures employing multiple processor designs for increased computing capability.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for providing searchable videos, the method executed by a computer system comprising one or more processors, and comprising:

receiving a labeled training dataset comprising a set of training videos together with textual data descriptive of visual content for each of two or more frames of each training video;

extracting from the set of training videos one or more features characterizing the visual content of each of the two or more frames from each of the training videos;

training a machine-learned model based at least in part on the labeled training dataset to learn correlations between the one or more features characterizing the visual content of each of the two or more frames and one or more keyword representations;

inputting to the machine-learned model data associated with two or more frames of each of a plurality of videos associated with a searchable video index;

generating, for each of the two or more frames of the plurality of videos associated with the searchable video index, at least one keyword representation based on one or more outputs of the machine-learned model for said each of the two or more frames;

selecting, in response to a search query including one or more query terms, a first video and a first frame of the first video based at least in part on the one or more query terms and at least one keyword representation in the searchable video index for the first frame of the first video; and providing, in response to the search query, one or more responses including the first frame of the first video and a link to the first video.

2. The computer-implemented method of claim 1, wherein:

a first keyword representation for the first frame of the first video is different than a second keyword representation for a second frame of the first video.

3. The computer-implemented method of claim 1, wherein the one or more features are one or more feature vectors.

4. The computer-implemented method of claim 3, further comprising:

extracting a plurality of keyword representations from the labeled training dataset;

wherein training the machine-learned model includes training the machine-learned model to learn correlations between the one or more feature vectors and the one or more keyword representations based at least in part of the plurality of keyword representations extracted from the labeled training data.

5. The computer-implemented method of claim 4, further comprising:

generating at least one feature vector for each of the two or more frames of each of the plurality of videos associated with the video index;

wherein inputting to the machine-learned model data associated with the two or more frames of each of the plurality of videos includes inputting the at least one feature vector for each of the two or more frames.

6. The computer-implemented method of claim 1, further comprising:

generating the searchable video index including a mapping between each of the two or more frames of the plurality of videos and the at least one keyword representation.

7. The computer-implemented method of claim 6, further comprising:

receiving the search query including the one or more query terms; and selecting the first video as having content relevant to the one or more query terms.

8. The computer-implemented method of claim 1, wherein:

the textual data of the labeled training dataset is based on a click-through dataset associated with queries and the set of training videos.

9. The computer-implemented method of claim 1, wherein:

the at least one keyword representation for said each of the two or more frames is a keyword score.

10. The computer-implemented method of claim 9, wherein:

the keyword score is a semantic vector representation.

11. The computer-implemented method of claim 1, wherein:

the at least one keyword representation for said each of the two or more frames is a vector of keyword association scores.

12. A computing system having one or more processors configured to perform operations comprising:

storing a searchable video index associated with a plurality of videos that each include a plurality of frames, the searchable video index including a mapping between two or more frames of each of the plurality of videos and one or more keyword representations, the mapping generated based at least in part on a machine-learned model trained to learn correlations between visual content of individual video frames and keyword representations;

receiving a search query including one or more textual keywords;

selecting a first video from the searchable video index based on the one or more textual keywords;

determining a frame of the first video based at least in part on the one or more textual keywords and the mapping between the two or more frames of each of the plurality of videos and the one or more keyword representations; and providing a result set including the frame of the first video and a link to the first video in response to the search query.

13. The computing system of claim 12, wherein the operations further comprise:

receiving a labeled training dataset comprising a set of training videos together with textual data descriptive of visual content for each of two or more frames of each training video;

extracting from the set of training videos one or more features characterizing the visual content of each of the two or more frames from each of the training videos;

training the machine-learned model based at least in part on the labeled training dataset to learn correlations between the one or more features characterizing the visual content of each of the two or more frames and the one or more keyword representations;

inputting to the machine-learned model data associated with two or more frames of each of a plurality of videos associated with a video index; and generating, for each of the two or more frames of the plurality of videos associated with the video index, at least one keyword representation based on one or more outputs of the machine-learned model for said each of the two or more frames.

14. The computing system of claim 13, wherein the operations further comprise:

generating the video index based at least in part on the machine-learned model.

15. The computing system of claim 14, wherein the operations further comprise:
generating at least one feature vector for each of the two or more frames of each of the plurality of videos associated with the searchable video index;
wherein inputting to the machine-learned model data associated with the two or more frames of each of the plurality of videos includes inputting the at least one feature vector for each of the two or more frames.

16. The computing system of claim 15, wherein the one or more features extracted from the set of training videos is one or more feature vectors.

17. The computing system of claim 16, further comprising:
extracting a plurality of keyword representations from the labeled training dataset;
wherein training the machine-learned model includes training the machine-learned model to learn correlations between the one or more feature vectors and the one or more keyword representations based at least in part of the plurality of keyword representations extracted from the labeled training data.

18. The computing system of claim 12, wherein the operations further comprise:
transmitting, by the computing system to a client device, one or more responses to the search query including the frame of the first video and the link to the first video.

19. One or more non-transitory computer readable storage media storing computer executable code that when executed by one or more processors cause the one or more processors to perform operations, the operations comprising:
receiving a labeled training dataset comprising a set of training videos together with one or more textual keywords descriptive of visual content of at least several frames of each of the training videos;
extracting features characterizing the visual content of the several frames of the training videos;
generating a plurality of representative feature vectors based on the several frames of the training videos;
determining a plurality of textual keywords associated with the labeled training dataset;
training a machine-learned model using data indicative of an association between the representative feature vectors and the plurality of textual keywords to learn correlations between the extracted features characterizing the visual content of the several frames of the training videos and the textual keywords descriptive of the visual content; and
generating a searchable video index including data indicative of a mapping between at least several frames of a plurality of indexed videos to the one or more textual keywords based on features of the several frames of the plurality of indexed videos and the machine-learned model;
selecting, in response to a search query including one or more query terms, a first video and a first frame of the first video based at least in part on the one or more query terms and at least one textual keyword in the searchable video index for the first frame; and
providing, in response to the search query, one or more responses including the first frame of the first video and a link to the first video.

20. The one or more non-transitory computer readable storage media of claim 19, wherein the operations further comprise:
receiving the search query including the one or more query terms; and
selecting the first video as having content relevant to the one or more query terms.

* * * * *